(12) United States Patent
Mehta et al.

(10) Patent No.: US 10,719,736 B1
(45) Date of Patent: Jul. 21, 2020

(54) FEATURE SUBMISSION DE-DUPLICATION ENGINE

(71) Applicant: Accenture Global Solutions Limited, Dublin (IE)

(72) Inventors: Bhavin Mehta, Mumbai (IN); Mohan Sekhar, Bangalore (IN); Jayant Swamy, Bangalore (IN); Raghavan Iyer, Bangalore (IN); Suja Jain, Bangalore (IN); Juhi A Gupta, Mumbai (IN); Chandrashekhar Arun Deshpande, Thane (IN); Abigail Hart, Bangalore (IN); Sriram Lakshminarasimhan, Chennai (IN); Achal Srivastava, Gurgaon (IN); Sadanand Padmawar, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/372,888

(22) Filed: Apr. 2, 2019

(51) Int. Cl.
*G06F 9/44* (2018.01)
*G06K 9/62* (2006.01)
(Continued)

(52) U.S. Cl.
CPC .............. *G06K 9/6232* (2013.01); *G06F 8/10* (2013.01); *G06F 8/20* (2013.01); *G06F 16/2365* (2019.01);
(Continued)

(58) Field of Classification Search
CPC .... G06N 3/0454; G06N 5/02; G06Q 20/3226; G06Q 50/01; H04L 9/0637; G06F 16/35;
(Continued)

(56) References Cited

U.S. PATENT DOCUMENTS

2007/0239643 A1\* 10/2007 Liu .................. G06F 16/35
706/29
2011/0219012 A1\* 9/2011 Yih .................. G06F 16/00
707/749
(Continued)

OTHER PUBLICATIONS

Accenture, "Meet the Winners", https://accentureinnovationchallenge.com/, Apr. 29, 2018, 3 pages.
(Continued)

*Primary Examiner* — Tuan A Vu
(74) *Attorney, Agent, or Firm* — Harrity & Harrity, LLP

(57) ABSTRACT

A device may receive a feature submission identifying a candidate feature for a software application. The device may pre-process the feature submission to reformat data associated with the candidate feature to match a data format associated with stored information regarding past feature submissions. The device may perform natural language processing on the data associated with the candidate feature to determine a semantic meaning of the candidate feature. The device may compare the semantic meaning of the candidate feature with an index of past feature submissions. The device may provide a response indicating whether the candidate feature matches the past feature submissions wherein the response comprises an indication that the candidate feature does not match any past feature submission or information identifying one or more past feature submissions associated with a threshold semantic similarity to the candidate feature.

20 Claims, 8 Drawing Sheets

(51) Int. Cl.
| | |
|---|---|
| *G06F 8/20* | (2018.01) |
| *G06F 16/23* | (2019.01) |
| *G06F 8/10* | (2018.01) |
| *G06N 20/00* | (2019.01) |
| *G06F 16/25* | (2019.01) |
| *G06F 40/30* | (2020.01) |
| *G06F 40/20* | (2020.01) |
| *G06F 16/22* | (2019.01) |
| *G06F 40/289* | (2020.01) |

(52) U.S. Cl.
CPC .......... *G06F 16/258* (2019.01); *G06F 40/20* (2020.01); *G06F 40/30* (2020.01); *G06N 20/00* (2019.01); *G06F 16/2237* (2019.01); *G06F 16/2264* (2019.01); *G06F 40/289* (2020.01); *G06K 9/6215* (2013.01); *G06K 9/6256* (2013.01)

(58) Field of Classification Search
CPC .......... G06F 16/93; G06F 16/00; G06F 40/30; G06F 40/289; G06F 40/20; G06F 16/2237; G06F 16/2264; G06F 17/15; G06K 9/6256; G06K 9/72; G06K 9/6232; G06K 9/6215
See application file for complete search history.

(56) References Cited

U.S. PATENT DOCUMENTS

| | | | | |
|---|---|---|---|---|
| 2012/0233127 | A1* | 9/2012 | Solmer | G06F 16/93 |
| | | | | 707/661 |
| 2015/0286713 | A1* | 10/2015 | Zhang | G06N 5/02 |
| | | | | 707/749 |
| 2016/0092427 | A1* | 3/2016 | Bittmann | G06F 40/30 |
| | | | | 704/9 |
| 2016/0140643 | A1* | 5/2016 | Nice | G06F 40/30 |
| | | | | 705/26.7 |
| 2018/0181667 | A1* | 6/2018 | Kolb | G06Q 50/01 |
| 2019/0236598 | A1* | 8/2019 | Padmanabhan | G06N 3/0454 |
| 2019/0280854 | A1* | 9/2019 | Wadhwa | H04L 9/0637 |
| 2020/0074440 | A1* | 3/2020 | Fullman | G06Q 20/3226 |

OTHER PUBLICATIONS

Servicenow, "Introduction the Now Platform", https://www.servicenow.com/content/dam/servicenow-assets/public/en-us/doc-type/resource-center/data-sheet/ds-servicenow-platform.pdf, Nov. 10, 2018. 2 pages.
Brightidea, "Get the #1 software for Innovation Program Management", https://www.brightidea.com/, Oct. 13, 2018, 6 pages.
salesforce.com inc., "Understand and Work with Ideas", https://help.salesforce.com/articleView?id=ideas_about.htm&type=5, Sep. 13, 2017, 3 pages.

* cited by examiner

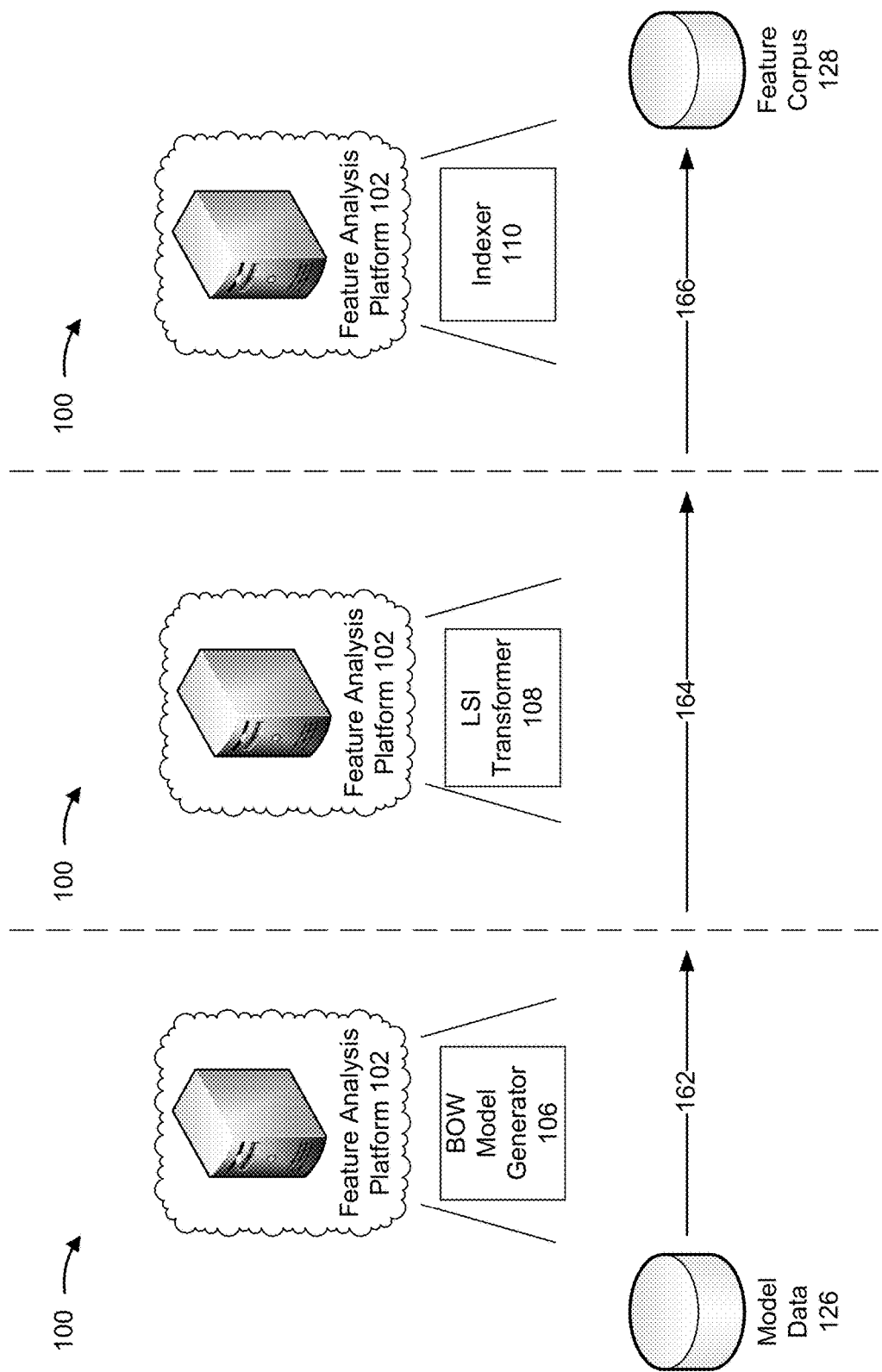

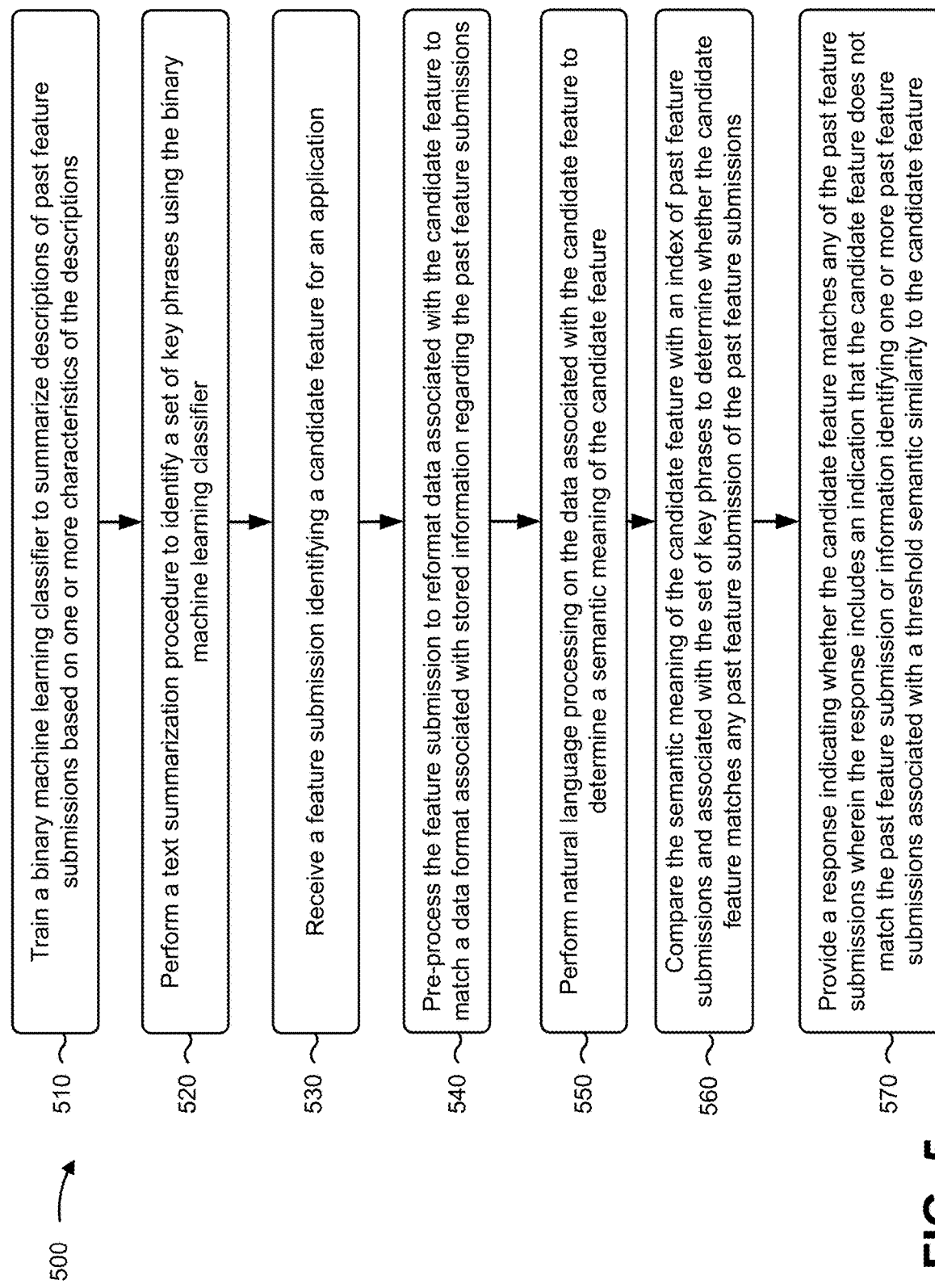

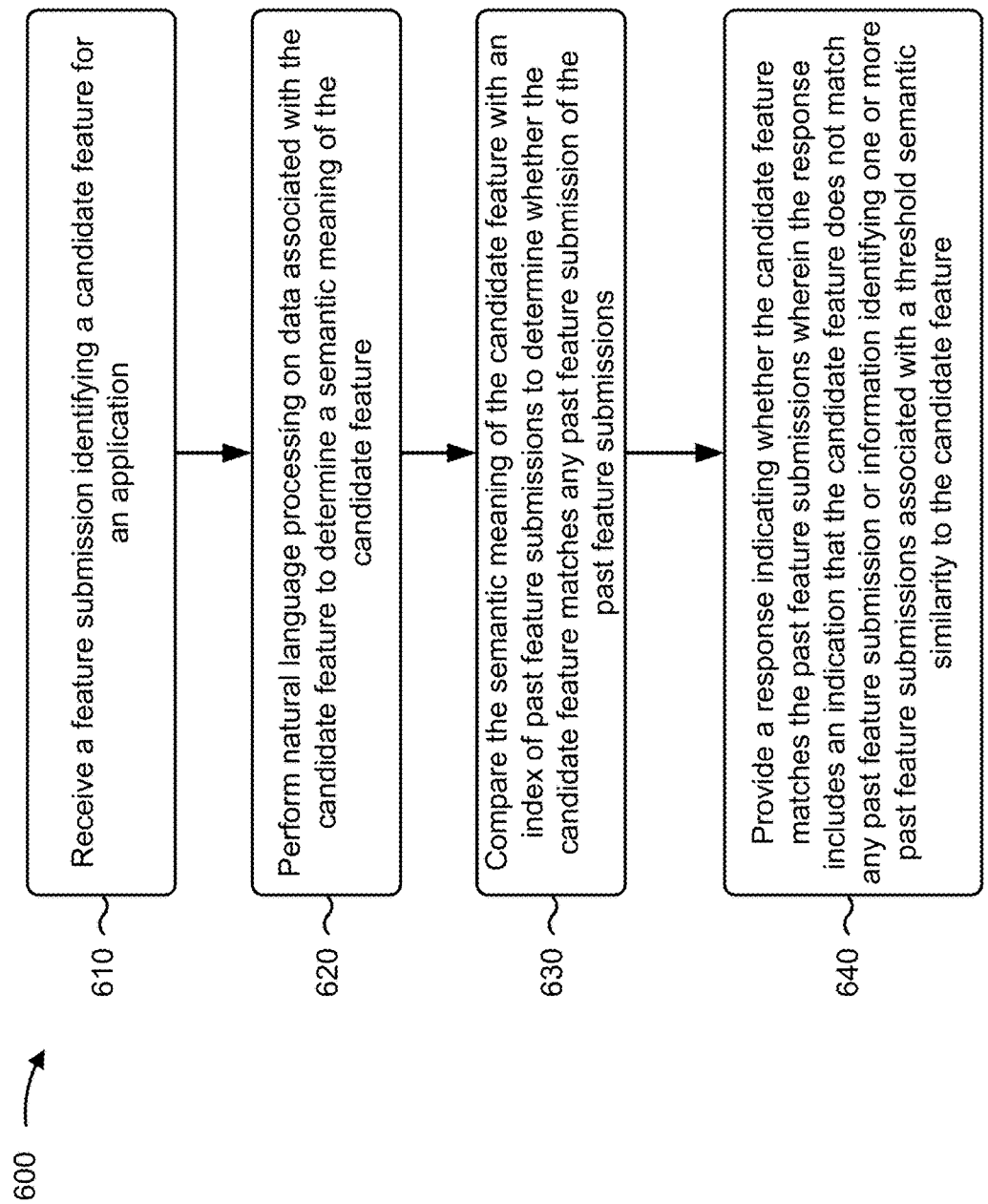

FEATURE SUBMISSION DE-DUPLICATION ENGINE

BACKGROUND

During development and/or maintenance of complex systems, multiple stakeholders may be responsible for feature ideation, feature implementation, and feature monitoring. For example, when a software application is deployed for use in an organization, many members of the organization may use the software application to complete tasks. Further, many members of the organization may provide feature submissions to teams of software developers to suggest new features for the software application. The teams of software developers may select a subset of feature submissions to which to devote resources (e.g., time resources, computing resources, and/or the like) toward developing.

SUMMARY

According to some implementations, a method may include receiving, from a device, a feature submission identifying a candidate feature for a software application; pre-processing, by the device, the feature submission to reformat data associated with the candidate feature to match a data format associated with stored information regarding past feature submissions; performing, by the device, natural language processing on the data associated with the candidate feature to determine a semantic meaning of the candidate feature; comparing, by the device, the semantic meaning of the candidate feature with an index of past feature submissions to determine whether the candidate feature matches any past feature submission of the past feature submissions; and providing, by the device, a response indicating whether the candidate feature matches within a threshold semantic similarity any of the past feature submissions, wherein the response comprises an indication that the candidate feature does not match any past feature submission or information identifying one or more past feature submissions associated with the threshold semantic similarity to the candidate feature.

According to some implementations, a device may include one or more memories; and one or more processors, communicatively coupled to the one or more memories, configured to: train a binary machine learning classifier to summarize descriptions of past feature submissions based on one or more features of the descriptions; perform a text summarization procedure to identify a set of key phrases using the binary machine learning classifier; receive a feature submission identifying a candidate feature for an application; pre-process the feature submission to reformat data associated with the candidate feature to match a data format associated with stored information regarding the past feature submissions; perform natural language processing on the data associated with the candidate feature to determine a semantic meaning of the candidate feature; compare the semantic meaning of the candidate feature with an index of past feature submissions and associated with the set of key phrases to determine whether the candidate feature matches any past feature submission of the past feature submissions; and provide a response indicating whether the candidate feature matches any of the past feature submissions, wherein the response includes an indication that the candidate feature does not match any past feature submission or information identifying one or more past feature submissions associated with a threshold semantic similarity to the candidate feature.

According to some implementations, a non-transitory computer-readable medium may store one or more instructions. The one or more instructions, when executed by one or more processors of a device, may cause the one or more processors to: receive a feature submission identifying a candidate feature for an application; perform natural language processing on data associated with the candidate feature to determine a semantic meaning of the candidate feature; compare the semantic meaning of the candidate feature with an index of past feature submissions to determine whether the candidate feature matches any past feature submission of the past feature submissions; and provide a response indicating whether the candidate feature matches the past feature submissions, wherein the response includes an indication that the candidate feature does not match any past feature submission or information identifying one or more past feature submissions associated with a threshold semantic similarity to the candidate feature.

BRIEF DESCRIPTION OF THE DRAWINGS

FIGS. 1A-1E are diagrams of an example implementation described herein.

FIG. 5 is a flow chart of an example process for feature submission de-duplication and blockchain-based feature management.

FIG. 6 is a flow chart of an example process for feature submission de-duplication and blockchain-based feature management.

DETAILED DESCRIPTION

The following detailed description of example implementations refers to the accompanying drawings. The same reference numbers in different drawings may identify the same or similar elements.

In increasingly complex organizations, ideation is a distributed process. For example, an organization may have thousands, tens of thousands, hundreds of thousands, or even millions of employees or associated personnel. As a result, expertise in using different software applications, tools, and/or the like may be globally distributed across many teams of employees. An organization may deploy a feature submission platform to receive feature submissions identifying different ideas for improving a software application, a tool, and/or the like. The feature submission platform may receive the feature submissions and may automatically generate code to create a new feature for a software application or may automatically assign software developers to attempt to develop code for a software application, a tool associated with a software application, a new version of a software application, and/or the like.

However, many feature submissions may be duplicative of other feature submissions submitted by other employees. For example, a first employee may identify a deficiency in a software application, such as an error, a missing feature, an inefficiency, and/or the like, and may submit a first feature submission to identify a solution to the deficiency. Before the deficiency is remedied, a second employee may identify the same deficiency in the same software application and submit a second feature submission to identify the same or a different solution. As a result, multiple different tools, versions of software applications, and/or the like may be developed. Such development may be duplicative, may waste computing resources, may result in excess time resulting from non-coordinated work between multiple different teams of software developers assigned to a same new feature, and/or the like.

Some implementations described herein provide feature submission de-duplication, thereby reducing utilization of computing resources associated with developing duplicative, parallel, and/or conflicting solutions. For example, some implementations may use natural language processing and/or machine learning to detect duplicative feature submissions, provide notifications regarding duplicative feature submissions, merge duplicative feature submissions, and/or the like. Moreover, some implementations described herein may provide for blockchain-based feature management, thereby enabling secure feature submission sponsorship and feature development management.

Figure 1A:
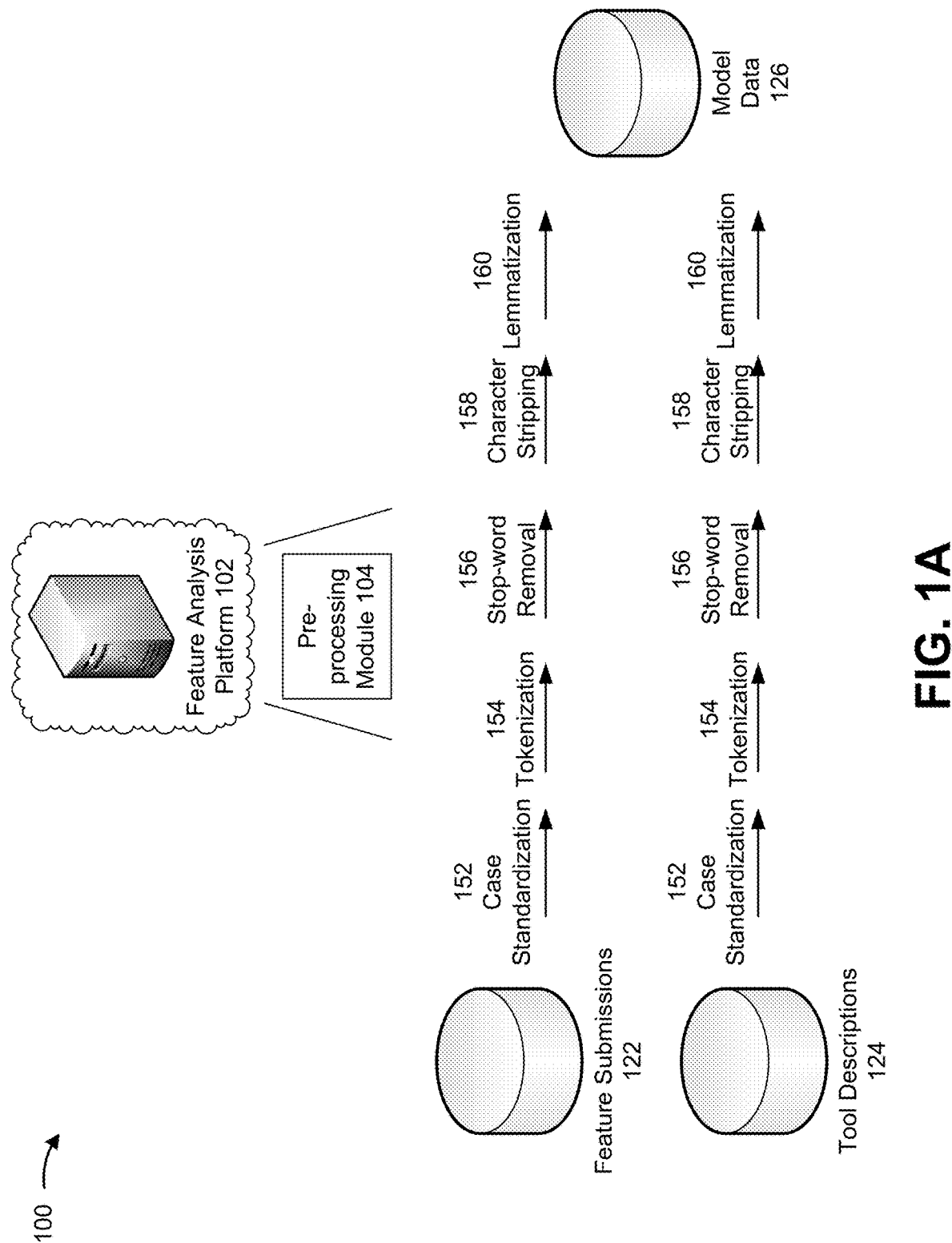

FIGS. 1A-1E are diagrams of an example implementation 100 described herein. As shown in FIG. 1A, example implementation 100 may include a feature analysis platform 102.

As further shown in FIG. 1A, feature analysis platform 102 may include a pre-processing module 104 that feature analysis platform 102 may use to pre-process input data to feature analysis platform 102. As shown by reference number 122, feature analysis platform 102 may receive input data identifying a set of feature submissions for pre-processing using pre-processing module 104. For example, feature analysis platform 102 may receive information identifying one or more candidate features that have been submitted to a feature management platform. In this case, the one or more candidate features may include one or more software features, one or more hardware features, one or more methodology features, and/or the like. In some implementations, feature analysis platform 102 may establish a model pipeline for obtaining the input data. For example, feature analysis platform 102 may identify a directory storing information regarding the set of feature submissions and may obtain data from the directory for pre-processing.

In some implementations, feature analysis platform 102 may receive a feature submission identifying a feature. For example, when generating a feature corpus of features for de-duplication, as described in more detail herein, feature analysis platform 102 may receive information identifying one or more prior feature submissions submitted at a prior time to the feature management platform. In this case, feature analysis platform 102 may perform de-duplication on the one or more prior feature submissions, as described in more detail herein, and may alter one or more existing task assignments to merge duplicate task assignments associated with duplicate prior feature submissions.

Additionally, or alternatively, feature analysis platform 102 may receive a feature submission identifying a problem statement. For example, feature analysis platform 102 may receive a natural language description of a problem with a software application. In this case, the feature submission may be a trouble ticket, a forum submission, a chat message, a record of an interaction with an information technology (IT) employee, and/or the like. In some implementations, feature analysis platform 102 may receive a description of an innovation theme. For example, feature analysis platform 102 may receive information identifying a description of an innovation contest, an innovation challenge, and/or the like associated with an organization. In this case, when performing feature de-duplication, feature analysis platform 102 may classify a new feature submission as being related to the innovation theme, and may cause the new feature submission to be automatically included in an innovation contest, an innovation challenge, and/or the like for selection for development.

As further shown in FIG. 1A, and by reference number 124, feature analysis platform 102 may receive input data identifying a set of tool descriptions. For example, feature analysis platform 102 may receive information identifying one or more software applications, one or more tools, and/or the like that are subject to feature submission. In this case, the one or more software applications, the one or more tools, and/or the like may be software applications and/or tools used by a particular organization for which feature analysis platform 102 is deployed. In some implementations, the set of tool descriptions may include program code documentation, marketing information, and/or the like. In some implementations, when feature analysis platform 102 is deployed for use with a particular software application, feature analysis platform 102 may receive input data identifying a description of the particular software application, for use in identifying feature submissions from users of the particular software application who may or may not be associated with a common organization.

As further shown in FIG. 1A, and by reference numbers 152-160, using pre-processing module 104, feature analysis platform 102 may perform a set of pre-processing procedures on the input data to generate model data for determining feature submission similarity. For example, feature analysis platform 102 may perform a case standardization procedure. In this case, feature analysis platform 102 may pre-process the input data to remove differences in case (e.g., to convert feature submission descriptions to all lower-case letters). Additionally, or alternatively, feature analysis platform 102 may perform a tokenization procedure. For example, feature analysis platform 102 may divide natural language descriptions of feature submissions into sequences (e.g., tokens) that correspond to individual words, sentences, paragraphs, and/or the like. Additionally, or alternatively, feature analysis platform 102 may perform a stop-word removal procedure. For example, feature analysis platform 102 may filter out one or more words that lack semantic meaning, such as articles (e.g., "a", "the", etc.), pronouns (e.g., "I", "me", etc.), and/or the like, thereby reducing a processing utilization and/or a memory utilization associated with natural language processing. Additionally, or alternatively, feature analysis platform 102 may perform a character stripping procedure. For example, feature analysis platform 102 may remove one or more characters, such as numerals, special characters, and/or the like, which may lack semantic meaning, thereby reducing a processing utilization and/or a memory utilization associated with natural language processing. Additionally, or alternatively, feature analysis platform 102 may perform a lemmatization procedure. For example, feature analysis platform 102 may group together inflected forms of words for analyzation as a single item based on a word's lemma. In this way, feature analysis platform 102 may pre-process data relating to feature submissions for use in determining a similarity of a new feature submission to past feature submissions.

As shown in FIG. 1B, and by reference number 162, feature analysis platform 102 may use a bag of words (BOW) model generator 106 to process the model data 126 and generate a bag of words type of model. For example, feature analysis platform 102 may generate a dictionary object mapping words to identifiers and may transform the dictionary object to a bag of words model. In this case, the bag of words model may represent a count of a quantity of occurrences of each semantically distinct word (e.g., each lemma) of a description of a candidate feature of the past feature submissions, which is corresponded to each integer word identifier and which is represented as a sparse vector.

As further shown in FIG. 1C, and by reference number 164, feature analysis platform 102 may use a latent semantic indexing (LSI) transformer 108 to further process the model data 126. For example, feature analysis platform 102 may perform a matrix decomposition (e.g., a singular value decomposition (SVD) procedure) on the bag of words model to generate a set of sparse vectors. In this case, feature analysis platform 102 may determine a singular value decomposition with respect to a term frequency matrix using an LSI procedure and may generate LSI vectors and aggregate the LSI vectors into an LSI corpus.

As further shown in FIG. 1D, and by reference number 166, feature analysis platform 102 may use an indexer 110 to further process the model data 126 to generate a feature corpus 128 for use in performing feature de-duplication. For example, feature analysis platform 102 may generate an index corresponding to a quantity of dimensions of the feature corpus. In this case, when a new feature submission is received, as described herein, the new feature submission may be processed using pre-processing module 104 and represented as an LSI vector, which may enable feature analysis platform 102 to determine a similarity score based on a similarity of the LSI vector to other LSI vectors of the feature corpus using the index. In some implementations, feature analysis platform 102 may perform a dimensionality reduction procedure to reduce a quantity of dimensions of the feature corpus.

In some implementations, feature analysis platform 102 may perform a text summarization procedure using feature corpus 128. For example, feature analysis platform 102 may shorten a segment of text to generate a summary of the text. In this case, the summary of the text may represent a coherent and fluent version of the text identifying sub-segments (e.g., representing main points of the text) with a highest determined level of semantic meaning relative to other sub-segments. In this case, feature analysis platform 102 may use a summarized text as a tag in the index, may provide the summarized text as a response to a search of the index, and/or the like. In some implementations, feature analysis platform 102 may perform part-of-speech tagging, word sequence analysis, linguistic pattern recognition, and/or the like to identify key phrases that may be classified as sub-segments with a highest semantic meaning. In some implementations, feature analysis platform 102 may train and use a binary machine learning classifier to generate the summarized text and/or identify the key phrases therein. In contrast, feature analysis platform 102 may negatively label non-key phrases with a lowest semantic meaning for omission from a summary. In some implementations, feature analysis platform 102 may use a machine learning technique, such as a binary machine learning classifier technique to perform a text summarization based on a set of characteristics (e.g., a length of a key phrase, a frequency of a key phrase, a most recurring word in a key phrase, a quantity of characters in a key-phrase, and/or the like), which may be termed features.

Figure 1E:
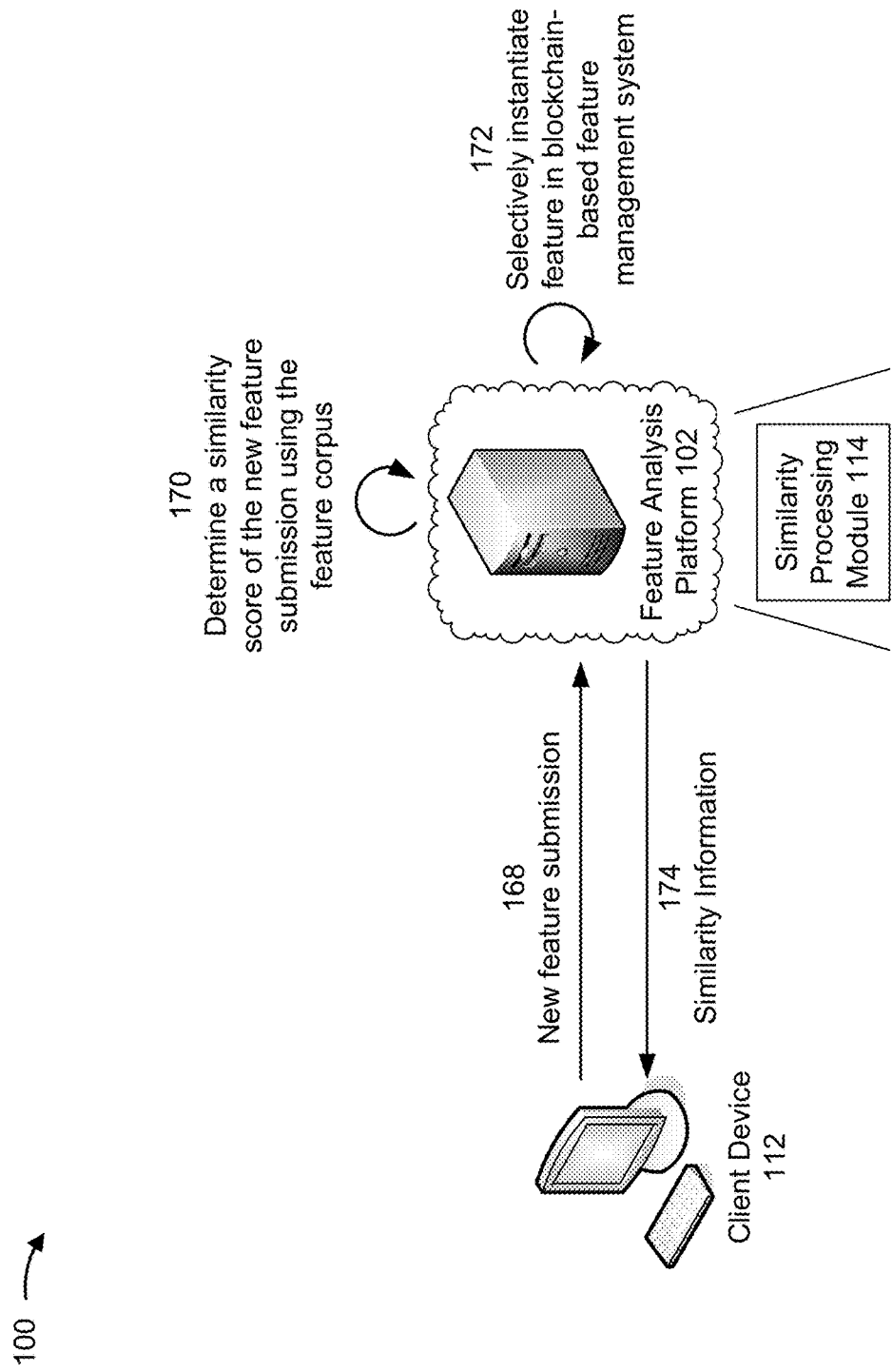

As shown in FIG. 1E, and by reference number 168, after generating feature corpus 128, feature analysis platform 102 may receive a new feature submission from a client device 112. For example, feature analysis platform 102 may receive a natural language description of a new feature, a problem with a software application, a theme for feature innovation, and/or the like. In some implementations, feature analysis platform 102 may receive other information in the new feature submission. For example, feature analysis platform 102 may receive program code in which an error is detected, a set of classifications or tags for the feature submission, and/or the like and may use the other information for feature de-duplication.

In some implementations, feature analysis platform 102 may provide a user interface with which to receive the new feature submission. For example, feature analysis platform 102 may generate a user interface and provide the user interface via client device 112. In this case, client device 112 may detect a user interaction associated with identifying a new feature, such as receiving a natural language description of a new feature, and may provide the new feature submission to feature analysis platform 102 for processing.

In some implementations, feature analysis platform 102 may provide a feed to client device 112 and may receive the new feature submission as a response to providing the feed. For example, based on a configured profile, feature analysis platform 102 may identify feature submissions of interest to a user associated with the configured profile (e.g., based on a user interest, a user role, a user education, etc.). In this case, feature analysis platform 102 may provide identified feature submissions of interest to client device 112 for display, to enable ideation by the user, and may receive a new feature submission based on the feature submissions of interest. In some implementations, feature analysis platform 102 may receive and/or provide the feed as one or more real simple syndication (RSS) feeds. For example, feature analysis platform 102 may identify a data feed associated with updates regarding a particular industry for which a software application pertains, may subscribe to the data feed, may periodically add new features identified from the data feed to the feature corpus, may periodically provide updates to a user regarding new features, and may use the feature corpus for feature de-duplication. Additionally, or alternatively, feature analysis platform 102 may generate a data feed and may provide the data feed to client device 112 to update a user regarding new features.

In some implementations, feature analysis platform 102 may provide notifications associated with a contest or challenge to facilitate receiving the new feature submission. For example, feature analysis platform 102 may receive an indication of an innovation theme (e.g., from client device 112), may identify a set of submitters of previous feature submissions related to the innovation theme, and may transmit notifications of the innovation theme to client devices used by the set of submitters. In this way, feature analysis platform 102 may facilitate an innovation contest or competition. In some implementations, feature analysis platform 102 may target an innovation contest to a particular client, a particular subset of developers, a public group, and/or the like. For example, feature analysis platform 102 may publish a website identifying the innovation contest and may receive the feature submission via the website.

In some implementations, feature analysis platform 102 may provide a chatbot functionality to guide a user in providing information associated with the new feature submission. For example, feature analysis platform 102 may use a natural language processing (NLP) functionality to analyze human language and provide answers, obtain information, and/or the like by communicating with a user using textual communications, audio communications (e.g., by using a text-to-speech generator and/or a speech-to-text generator), video communications, and/or the like. In this case, feature analysis platform 102 may process a natural language question by a user to determine an intent, a semantic meaning, and/or the like, and to detect a corresponding response in a data structure storing responses corresponding to a set of possible questions. In this way, feature analysis platform 102 may provide a natural language response, thereby reducing a technical difficulty in using feature analysis platform 102 for submitting ideas regarding features for a software application and reducing a need to provide large help files, which may waste memory resources to store and/or network resources to transmit.

In some implementations, feature analysis platform 102 may receive multiple new feature submissions from multiple client devices 112. For example, when operating in a globally distributed organization, feature analysis platform 102 may use a cloud computing environment, as described in more detail herein, to support use of hundreds, thousands, or even hundreds of thousands of concurrent users and/or submissions. In this way, feature analysis platform 102 enables performance of a similarity analysis for quantities of duplicate feature submissions that may be impractical to assign to individual developers for development. Moreover, by performing feature de-duplication and/or merging of duplicative feature submissions, feature analysis platform 102 may reduce a quantity of features for development to a quantity that is developable using available computing resources, thereby solving a technical problem of limited computing resources for feature development.

In some implementations, feature analysis platform 102 may define a set of roles and may enable some roles of the set of roles to submit new features. For example, feature analysis platform 102 may be deployed for an organization and may have roles defined for organizational clients, thereby allowing members of client organizations to submit feature submissions for development by the organization. In this case, feature analysis platform 102 may tag a new feature submission with an associated organization to enforce a security policy preventing inter-organization feature visibility in a multi-organization deployment. In some implementations, feature analysis platform 102 may define a user-level visibility for feature submissions based on the set of roles. For example, feature analysis platform 102 may enable a user with a first role to view a set of feature submissions (e.g., a manager may view all feature submissions) and may enable a user with a second role to view a subset of the set of feature submissions (e.g., a developer associated with a particular geographic location may only view feature submissions tagged to the particular geographic location, thereby facilitating geographic based knowledge-sharing restriction policies).

As further shown in FIG. 1E, and by reference number 170, feature analysis platform 102 may use a similarity processing module 114 to determine a similarity score for the new feature based on feature corpus 128. For example, feature analysis platform 102 may use a natural language processing technique to process the new feature submission and may use a machine learning technique to determine whether the new feature submission is duplicative of a previous feature submission in feature corpus 128.

In some implementations, feature analysis platform 102 may perform a guided machine learning process to facilitate similarity score generation. For example, feature analysis platform 102 may submit the new feature submission to a subject matter expert (e.g., a manager, a developer, etc.) for classification and may use the classification to generate the similarity score and to train subsequent automatic classification. In this way, feature analysis platform 102 enables generation of an automatic classification and similarity score generation model with reduced use of processing resources and/or in a reduced period of time relative to machine learning without subject matter expert guidance.

In some implementations, feature analysis platform 102 may use a text ranking analysis to search within the index for feature submissions matching a new feature submission. In this case, feature analysis platform 102 may concatenate text of a corpus (e.g., all text of feature submissions), split the text into a set of segments (e.g., sentences), determine word embeddings (e.g., a vector representation) of the set of segments, and determine similarities between sentences to calculate a similarity matrix. In this case, the similarity matrix may be a graph with segments (e.g., sentences) being vertices and similarity scores being edges, thereby enabling a sentence rank calculation and a determination of a top-ranked sentence in terms of semantic similarity, as described herein. In this way, by using the indexing, feature analysis platform 102 may reduce a utilization of processing resources relative to determining similarity scores for the new feature submission relative to each previous feature submission in feature corpus 128 without using indexing to identify a subset of similar previous feature submissions of feature corpus 128. In this case, feature analysis platform 102 may determine the similarity score based on the semantic similarity of text of the new feature submission with a top-ranked sentence or sentences of other feature submissions index in feature corpus 128.

In some implementations, feature analysis platform 102 may use a queue-based architecture to determine the similarity score. For example, feature analysis platform 102 may receive hundreds, thousands, or even millions of reporting requests (e.g., new feature submission requests, feature development status queries, etc.), and may queue each reporting request in a queue-based architecture for background processing. In this way, feature analysis platform 102 may enable use of feature analysis platform 102 (e.g., to submit a new feature submission and/or instantiate a new reporting request) concurrent with the background processing of the reporting requests.

In some implementations, feature analysis platform 102 may generate multiple similarity scores. For example, feature analysis platform 102 may generate a similarity score representing a similarity between the new feature submission and each feature submission indexed in the feature corpus 128. In this case, feature analysis platform 102 may compare a highest similarity score, a set of highest similarity scores, and/or the like with a threshold to determine whether the new feature submission matches a past feature submission.

As further shown in FIG. 1E, and by reference number 172, feature analysis platform 102 may selectively instantiate a new feature of the new feature submission in a blockchain-based feature management system. For example, feature analysis platform 102 may determine whether the new feature submission matches a previous feature submission based on whether the similarity score satisfies a threshold, and may determine whether to instantiate the new feature based on whether the new feature submission matches a previous feature submission. In this case, feature analysis platform 102 may automatically generate a blockchain transaction to store a record of the new feature and enable management of a status of the new feature, sponsorship of the new feature, and/or the like. In this way, feature analysis platform 102 reduces a likelihood of instantiating new features for development that are duplicative of other features that are already in development.

In some implementations, feature analysis platform 102 may determine a meta-score for the new feature submission based on the similarity score, and may determine whether to instantiate a new feature based on the meta-score. For example, feature analysis platform 102 may perform a benefit quantification procedure on the new feature submission to determine whether to accept the new feature submission. In this case, feature analysis platform 102 may analyze the feature submission to quantify a savings in computing resources, a savings in memory resources, an improvement to functionality, an improvement to user experience, and/or the like associated with the feature submission. Additionally, or alternatively, feature analysis platform 102 may determine a meta-score based on a novelty of an idea (e.g., the similarity score), whether the idea pertains to a trending topic (e.g., a topic with a threshold quantity of submissions, a topic of an idea generation contest, etc.), and/or the like.

In some implementations, feature analysis platform 102 may determine not to instantiate the new feature. For example, feature analysis platform 102 may determine that the similarity score satisfies a threshold indicating a match to a previous feature submission and may provide an alert to client device 112 indicating that the new feature submission matches the previous feature submission. In this case, feature analysis platform 102 may provide information identifying the previous feature submission, thereby enabling a user to modify the new feature submission to differentiate from the previous feature submission. In some implementations, feature analysis platform 102 may provide information identifying multiple previous feature submissions for which the similarity score satisfies a threshold and a user may interact with a user interface of client device 112 to select one or more of the multiple previous feature submissions into which to merge the new feature submission. In this case, feature analysis platform 102 may assign the user as a collaborator with developers assigned to the one or more of the multiple previous feature submissions and may provide notifications regarding merging the new feature submission to the developers. Additionally, or alternatively, feature analysis platform 102 may automatically merge the new feature submission with a similar past feature submission, and provide information regarding the merged feature submission to a developer developing a feature based on the similar past feature submission.

In some implementations, feature analysis platform 102 may add the new feature to a report. For example, based on instantiating the new feature in the blockchain-based feature management system, feature analysis platform 102 may add the new feature to a report of active features, and may provide notifications to a set of client devices (e.g., client device 112) indicating that the report of active features is updated. In some implementations, feature analysis platform 102 may perform analytics on the active features based on adding the new feature to the report of the active features.

In some implementations, feature analysis platform 102 may apply a voting procedure to the new feature submission before instantiating a new feature of the new feature submission. For example, feature analysis platform 102 may determine that the similarity score satisfies another threshold indicating that the new feature is not duplicative, and may publish the new feature submission to a voting system to obtain votes regarding whether to develop the new feature. In this case, feature analysis platform 102 may assign the new feature submission to a moderator, may assign the new feature submission to a set of reviewers, may collect voting scores and/or feedback from the set of reviewers and/or the moderator, and may determine whether to instantiate the new feature. In this case, based on instantiating the new feature, feature analysis platform 102 may automatically assign the new feature to a developer for development, allocate resources for developing the new feature, allocate resources for executing the new feature, generate an advertisement advertising the new feature, and/or the like.

In some implementations, feature analysis platform 102 may apply gamification techniques to managing the new feature based on instantiating the new feature. For example, feature analysis platform 102 may issue a tokenized virtual currency to sponsors (e.g., of feature submissions), and the sponsors may use the tokenized virtual currency to sponsor non-duplicative features (e.g., the new feature) for development. In this case, feature analysis platform 102 may track development of a sponsored feature (e.g., the new feature of the new feature submission) and may issue rating points based on tracking the development (e.g., approval of the development, successful development, rating of a developed feature, etc.), based on social collaboration, and/or the like.

In some implementations, feature analysis platform 102 may use a blockchain-based hyperledger to track the tokenized virtual currency, to determine a development leaderboard (e.g., of top developers of feature submissions, of top submitters of features, of top sponsors of features, etc.). For example, feature analysis platform 102 may allocate tokenized virtual currency, receive voting regarding which new features to develop, consume the tokenized virtual currency allocated to a new feature that is selected for development, allocate additional tokenized virtual currency to sponsors of the new feature based on a status of development, and use the blockchain-based hyperledger network to track allocation and consumption of the tokenized virtual currency.

In some implementations, feature analysis platform 102 may assign new features for development in a concurrent development cycle. For example, feature analysis platform 102 may divide a set of software developers into a set of teams and may assign different development tasks to each team to enable concurrent feature development. In this way, feature analysis platform 102 enables deployment of multiple releases of a software application within a relatively short timespan. Moreover, feature analysis platform 102 may assign a single development task to multiple teams of developers to enable a competitive, independent development process, thereby leveraging competition to ensure an optimal development of a new feature. Based on using feature de-duplication, feature analysis platform 102 may ensure that the competitive, independent development process is monitorable to determine which of multiple versions of the feature to deploy, thereby providing an improvement in a development process relative to multiple versions of a feature being developed unintentionally and therefore not being monitored and compared during development to select a single version for deployment.

In some implementations, feature analysis platform 102 may automatically assign a mentor to assist in development of a new feature relating to a feature submission. For example, feature analysis platform 102 may identify one or more software developers and/or one or more managers associated with working on past feature submissions with a threshold similarity to the new feature submission, and may assign the one or more software developers to develop a new feature of the new feature submission and the one or more managers to manage development of the new feature. In this way, feature analysis platform 102 ensures that employees with developed expertise in feature development are correctly assigned to tasks that are similar to previous tasks on which the employees have worked.

In some implementations, feature analysis platform 102 may assign development of a new feature in the new feature submission to a user who submitted the new feature submission. For example, when the new feature submission is submitted by a developer, feature analysis platform 102 may approve the new feature submission based on the new feature submission not satisfying a threshold similarity score, and may assign the developer to develop the new feature. In this case, the developer may provide, via client device 112, information identifying additional developers, and feature analysis platform 102 may automatically assign tasks associated with development of the new feature to the additional developers.

In this way, feature analysis platform 102 enables feature submission de-duplication, thereby reducing utilization of computing resources associated with developing duplicative, parallel, and/or conflicting solutions.

As indicated above, FIGS. 1A-1E are provided merely as one or more examples. Other examples may differ from what is described with regard to FIGS. 1A-1E.

Figure 2:
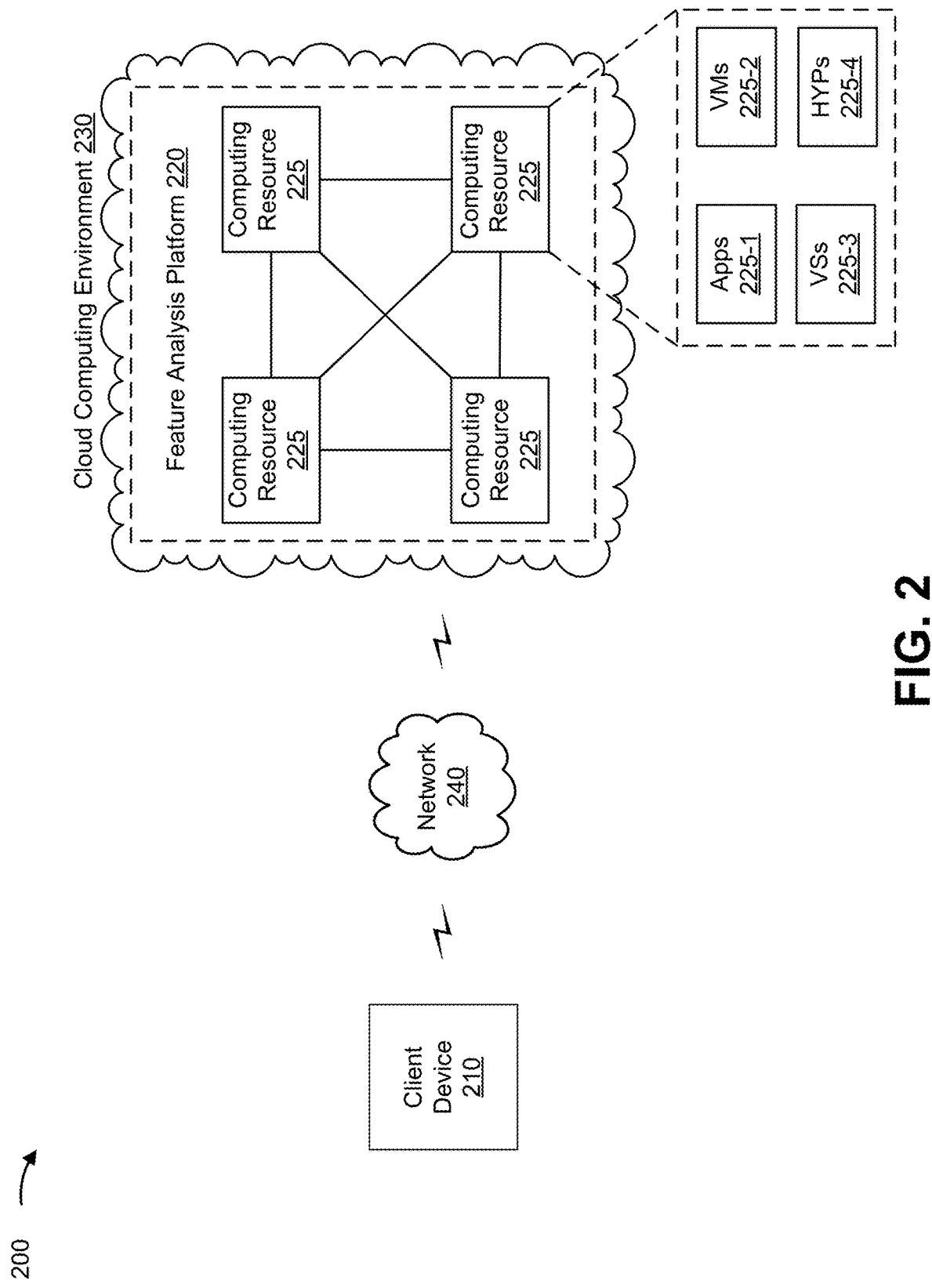
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a feature analysis platform 220, a computing resource 225, a cloud computing environment 230, and a network 240. Devices of environment 200 may interconnect via wired connections, wireless connections, or a combination of wired and wireless connections.

Client device 210 includes one or more devices capable of receiving, generating, storing, processing, and/or providing information associated with feature submission de-duplication and blockchain-based feature management. For example, client device 210 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Feature analysis platform 220 includes one or more computing resources assigned to perform feature submission de-duplication and blockchain-based feature management. For example, feature analysis platform 220 may be a platform implemented by cloud computing environment 230 that may feature submission de-duplication and blockchain-based feature management. In some implementations, feature analysis platform 220 is implemented by computing resources 225 of cloud computing environment 230.

Feature analysis platform 220 may include a server device or a group of server devices. In some implementations, feature analysis platform 220 may be hosted in cloud computing environment 230. Notably, while implementations described herein describe feature analysis platform 220 as being hosted in cloud computing environment 230, in some implementations, feature analysis platform 220 may be non-cloud-based or may be partially cloud-based.

Cloud computing environment 230 includes an environment that delivers computing as a service, whereby shared resources, services, etc. may be provided to perform feature submission de-duplication and blockchain-based feature management. Cloud computing environment 230 may provide computation, software, data access, storage, and/or other services that do not require end-user knowledge of a physical location and configuration of a system and/or a device that delivers the services. As shown, cloud computing environment 230 may include a feature analysis platform 220 and a computing resource 225.

Computing resource 225 includes one or more personal computers, workstation computers, server devices, or another type of computation and/or communication device. In some implementations, computing resource 225 may host feature analysis platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by client device 210. Application 225-1 may eliminate a need to install and execute the software applications on client device 210. For example, application 225-1 may include software associated with feature analysis platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program and may support a single process. In some implementations, virtual machine 225-2 may execute on behalf of a user (e.g., client device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
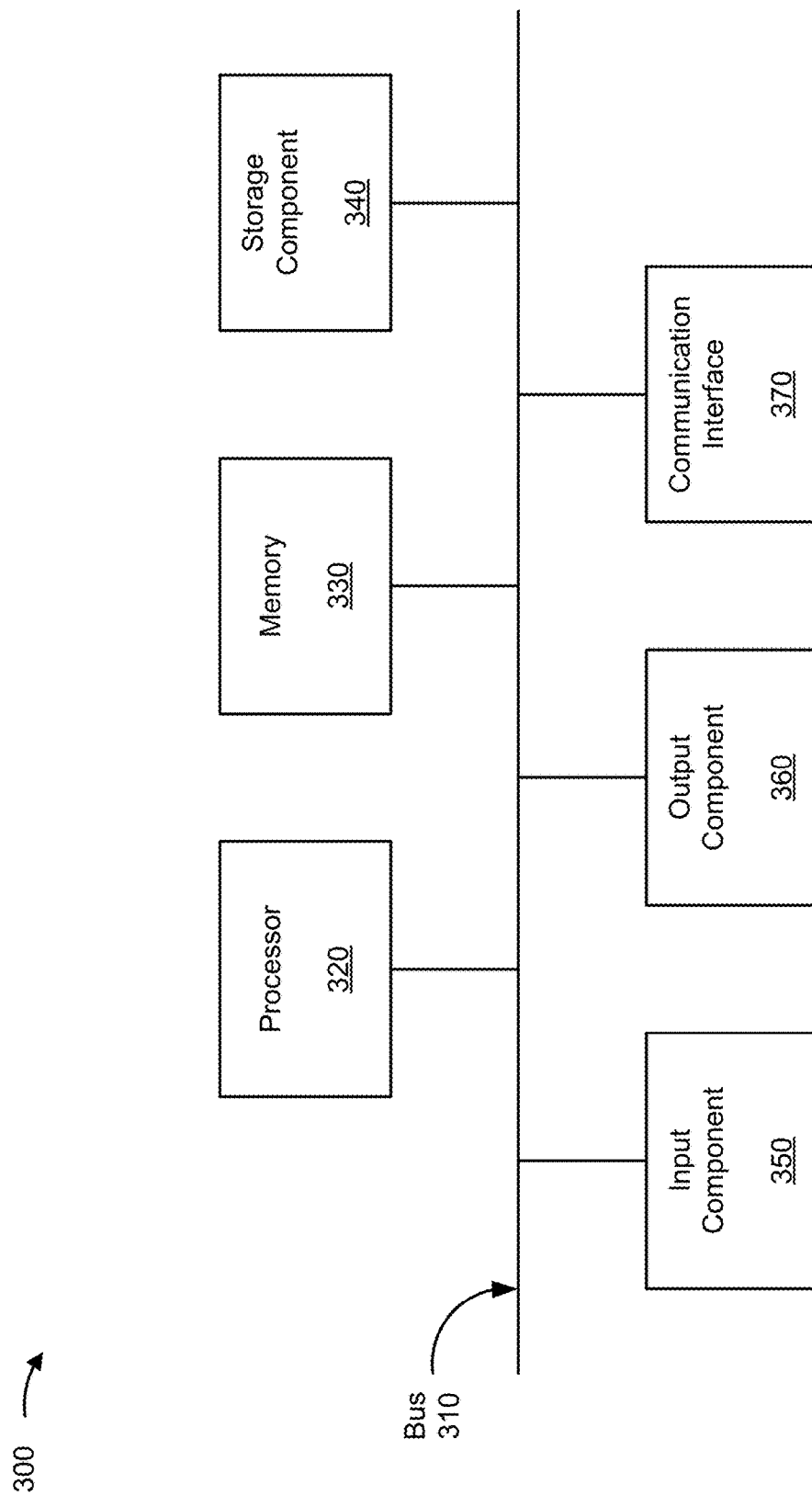
FIG. 3 is a diagram of example components of one or more devices of FIG. 2.

FIG. 3 is a diagram of example components of a device 300. Device 300 may correspond to client device 210, feature analysis platform 220, and/or computing resource 225. In some implementations, client device 210, feature analysis platform 220, and/or computing resource 225 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
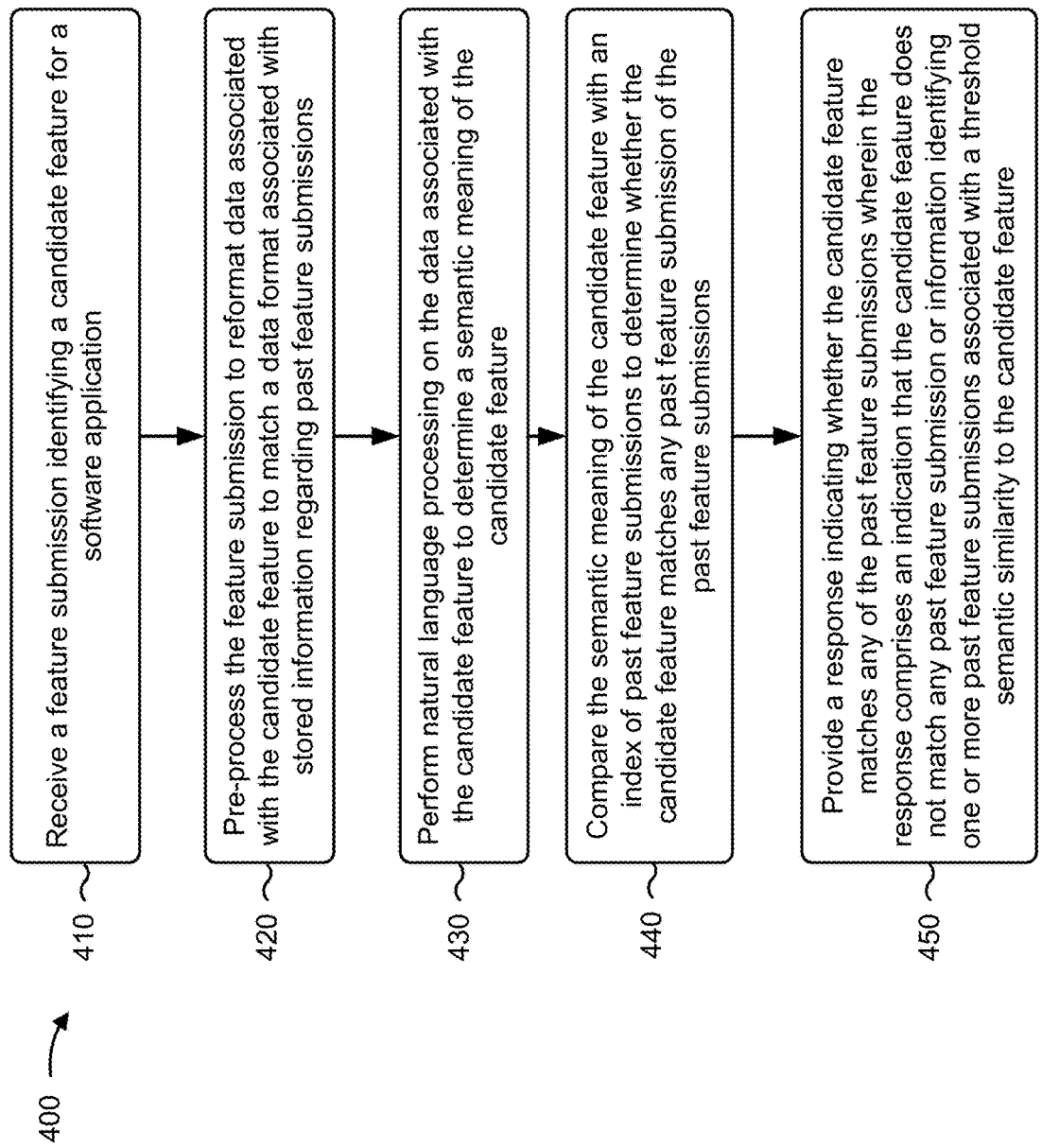
FIG. 4 is a flow chart of an example process for feature submission de-duplication and blockchain-based feature management.

FIG. 4 is a flow chart of an example process 400 for feature submission de-duplication and blockchain-based feature management. In some implementations, one or more process blocks of FIG. 4 may be performed by a feature analysis platform (e.g., feature analysis platform 220). In some implementations, one or more process blocks of FIG. 4 may be performed by another device or a group of devices separate from or including the feature analysis platform, such as a client device (e.g., client device 210) and/or the like.

As shown in FIG. 4, process 400 may include receiving a feature submission identifying a candidate feature for a software application (block 410). For example, the feature analysis platform (e.g., using processor 320, memory 330, storage component 340, input component 350, output component 360, communication interface 370 and/or the like)

may receive a feature submission identifying a candidate feature for a software application, as described above.

As further shown in FIG. 4, process 400 may include pre-processing the feature submission to reformat data associated with the candidate feature to match a data format associated with stored information regarding past feature submissions (block 420). For example, the feature analysis platform (e.g., using processor 320, memory 330, storage component 340, input component 350, output component 360, communication interface 370 and/or the like) may pre-process the feature submission to reformat data associated with the candidate feature to match a data format associated with stored information regarding past feature submissions, as described above.

As further shown in FIG. 4, process 400 may include performing natural language processing on the data associated with the candidate feature to determine a semantic meaning of the candidate feature (block 430). For example, the feature analysis platform (e.g., using processor 320, memory 330, storage component 340, input component 350, output component 360, communication interface 370 and/or the like) may perform natural language processing on the data associated with the candidate feature to determine a semantic meaning of the candidate feature, as described above.

As further shown in FIG. 4, process 400 may include comparing the semantic meaning of the candidate feature with an index of past feature submissions to determine whether the candidate feature matches any past feature submission of the past feature submissions (block 440). For example, the feature analysis platform (e.g., using processor 320, memory 330, storage component 340, input component 350, output component 360, communication interface 370 and/or the like) may compare the semantic meaning of the candidate feature with an index of past feature submissions to determine whether the candidate feature matches any past feature submission of the past feature submissions, as described above.

As further shown in FIG. 4, process 400 may include providing a response indicating whether the candidate feature matches any of the past feature submissions, wherein the response comprises an indication that the candidate feature does not match any past feature submission or information identifying one or more past feature submissions associated with a threshold semantic similarity to the candidate feature (block 450). For example, the feature analysis platform (e.g., using processor 320, memory 330, storage component 340, input component 350, output component 360, communication interface 370 and/or the like) may provide a response indicating whether the candidate feature matches any of the past feature submissions, as described above. In some aspects, the response comprises an indication that the candidate feature does not match any past feature submission or information identifying one or more past feature submissions associated with a threshold semantic similarity to the candidate feature.

Process 400 may include additional implementations, such as any single implementation or any combination of implementations described below and/or in connection with one or more other processes described elsewhere herein.

In some implementations, performing the natural language processing includes determining a quantity of occurrences of each semantically distinct word of a description of the candidate feature; converting each semantically distinct word of the description of the candidate feature to a corresponding integer word identifier based on the quantity of occurrences; and generating a sparse vector of the corresponding integer word identifiers. In some implementations, comparing the semantic meaning includes comparing the semantic meaning using the sparse vector. In some implementations, performing the natural language processing includes performing a latent semantic indexing procedure on information relating to a description of the candidate feature; and performing a dimensionality reduction procedure to reduce a dimensionality of a result of the latent semantic indexing procedure to within a configured dimensionality range. In some implementations, comparing the semantic meaning includes comparing the semantic meaning using a result of the dimensionality reduction procedure. In some implementations, process 400 includes identifying a data feed associated with a particular industry for which the software application pertains; subscribing to the data feed; adding a set of features to the past feature submissions from the data feed; and comparing the semantic meaning after adding the set of features. In some implementations, process 400 includes generating the index of past feature submissions and comparing the semantic meaning after generating the index.

In some implementations, generating the index includes training a binary machine learning classifier to summarize descriptions of the past feature submissions based on one or more features of the descriptions, and performing a text summarization procedure to identify a set of key phrases using the binary machine learning classifier. In some implementations, the one or more features include at least one of a length of a key phrase, a frequency of a key phrase, a quantity of recurring words in a key phrase, or a quantity of characters in a key phrase. In some implementations, generating the index further includes concatenating descriptions of the past feature submissions to generate a corpus; splitting the corpus into a set of segments; generating vector representations of the set of segments; determining similarities between the vector representations; generating a similarity matrix based on the similarities; and converting the similarity matrix into a graph.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for feature submission de-duplication and blockchain-based feature management. In some implementations, one or more process blocks of FIG. 5 may be performed by feature analysis platform (e.g., feature analysis platform 220). In some implementations, one or more process blocks of FIG. 5 may be performed by another device or a group of devices separate from or including the feature analysis platform, such as a client device (e.g., client device 210) and/or the like.

As shown in FIG. 5, process 500 may include training a binary machine learning classifier to summarize descriptions of past feature submissions based on one or more characteristics of the descriptions (block 510). For example, the feature analysis platform (e.g., using processor 320, memory 330, storage component 340, input component 350, output component 360, communication interface 370 and/or the like) may train a binary machine learning classifier to summarize descriptions of past feature submissions based on one or more characteristics of the descriptions, as described above.

As further shown in FIG. 5, process 500 may include performing a text summarization procedure to identify a set of key phrases using the binary machine learning classifier (block 520). For example, the feature analysis platform (e.g., using processor 320, memory 330, storage component 340, input component 350, output component 360, communication interface 370 and/or the like) may perform a text summarization procedure to identify a set of key phrases using the binary machine learning classifier, as described above.

As further shown in FIG. 5, process 500 may include receiving a feature submission identifying a candidate feature for an application (block 530). For example, the feature analysis platform (e.g., using processor 320, memory 330, storage component 340, input component 350, output component 360, communication interface 370 and/or the like) may receive a feature submission identifying a candidate feature for an application, as described above.

As further shown in FIG. 5, process 500 may include pre-processing the feature submission to reformat data associated with the candidate feature to match a data format associated with stored information regarding the past feature submissions (block 540). For example, the feature analysis platform (e.g., using processor 320, memory 330, storage component 340, input component 350, output component 360, communication interface 370 and/or the like) may pre-process the feature submission to reformat data associated with the candidate feature to match a data format associated with stored information regarding the past feature submissions, as described above.

As further shown in FIG. 5, process 500 may include performing natural language processing on the data associated with the candidate feature to determine a semantic meaning of the candidate feature (block 550). For example, the feature analysis platform (e.g., using processor 320, memory 330, storage component 340, input component 350, output component 360, communication interface 370 and/or the like) may perform natural language processing on the data associated with the candidate feature to determine a semantic meaning of the candidate feature, as described above.

As further shown in FIG. 5, process 500 may include comparing the semantic meaning of the candidate feature with an index of past feature submissions and associated with the set of key phrases to determine whether the candidate feature matches any past feature submission of the past feature submissions (block 560). For example, the feature analysis platform (e.g., using processor 320, memory 330, storage component 340, input component 350, output component 360, communication interface 370 and/or the like) may compare the semantic meaning of the candidate feature with an index of past feature submissions and associated with the set of key phrases to determine whether the candidate feature matches any past feature submission of the past feature submissions, as described above.

As further shown in FIG. 5, process 500 may include providing a response indicating whether the candidate feature matches any of the past feature submissions, wherein the response includes an indication that the candidate feature does not match any past feature submission or information identifying one or more past feature submissions associated with a threshold semantic similarity to the candidate feature (block 570). For example, the feature analysis platform (e.g., using processor 320, memory 330, storage component 340, input component 350, output component 360, communication interface 370 and/or the like) may provide a response indicating whether the candidate feature matches any of the past feature submissions, as described above. In some aspects, the response includes an indication that the candidate feature does not match any past feature submission or information identifying one or more past feature submissions associated with a threshold semantic similarity to the candidate feature.

Process 500 may include additional implementations, such as any single implementation or any combination of implementations described below and/or in connection with one or more other processes described elsewhere herein.

In some implementations, process 500 may include merging, based on determining that the candidate feature matches a past feature submission, the feature submission of the candidate feature with a description of the past feature submission; and providing information identifying a merged feature submission based on merging the feature submission with the description of the past feature submission. In some implementations, process 500 may include determining, based on the index, a trending feature topic; and providing output identifying the trending feature topic. In some implementations, process 500 may include storing, based on determining that the candidate feature does not match any past feature submissions, the candidate feature in a blockchain hyperledger network.

In some implementations, process 500 may include receiving a sponsorship indication for an entry in the blockchain hyperledger network corresponding to the candidate feature; registering the candidate feature for development based on receiving the sponsorship indication; tracking development of the candidate feature based on registering the candidate feature for development; and allocating, based on an outcome of tracking the development, one or more tokens to a sponsor associated with the sponsorship indication. In some implementations, the sponsorship indication includes a payment of a set of tokens and initiates a contract for the one or more tokens. In some implementations, process 500 may include determining that a sponsorship threshold is satisfied based on receiving the sponsorship indication; and registering the candidate feature for development based on determining that the sponsorship threshold is satisfied.

In some implementations, the hyperledger blockchain network is accessible by users associated with a plurality of different roles; and the plurality of different roles includes at least one of an innovator role, a co-innovator role, an implementor role, a mentor role, or a reviewer role. In some implementations, process 500 may include determining a role, of the plurality of different roles, for a user; and providing access to one or more features of the hyperledger blockchain network based on the role for the user.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for feature submission de-duplication and blockchain-based feature management. In some implementations, one or more process blocks of FIG. 6 may be performed by feature analysis platform (e.g., feature analysis platform 220). In some implementations, one or more process blocks of FIG. 6 may be performed by another device or a group of devices separate from or including the feature analysis platform, such as a client device (e.g., client device 210) and/or the like.

As shown in FIG. 6, process 600 may include receiving a feature submission identifying a candidate feature for an application (block 610). For example, the feature analysis platform (e.g., using processor 320, memory 330, storage component 340, input component 350, output component 360, communication interface 370 and/or the like) may receive a feature submission identifying a candidate feature for an application, as described above.

As further shown in FIG. 6, process 600 may include performing natural language processing on data associated with the candidate feature to determine a semantic meaning of the candidate feature (block 620). For example, the feature analysis platform (e.g., using processor 320, memory 330, storage component 340, input component 350, output component 360, communication interface 370 and/or the like) may perform natural language processing on data associated with the candidate feature to determine a semantic meaning of the candidate feature, as described above.

As further shown in FIG. 6, process 600 may include comparing the semantic meaning of the candidate feature with an index of past feature submissions to determine whether the candidate feature matches any past feature submission of the past feature submissions (block 630). For example, the feature analysis platform (e.g., using processor 320, memory 330, storage component 340, input component 350, output component 360, communication interface 370 and/or the like) may compare the semantic meaning of the candidate feature with an index of past feature submissions to determine whether the candidate feature matches any past feature submission of the past feature submissions, as described above.

As further shown in FIG. 6, process 600 may include providing a response indicating whether the candidate feature matches any of the past feature submissions wherein the response includes an indication that the candidate feature does not match any past feature submission or information identifying one or more past feature submissions associated with a threshold semantic similarity to the candidate feature (block 640). For example, the feature analysis platform (e.g., using processor 320, memory 330, storage component 340, input component 350, output component 360, communication interface 370 and/or the like) may provide a response indicating whether the candidate feature matches any of the past feature submissions, as described above. In some aspects, the response includes an indication that the candidate feature does not match any past feature submission or information identifying one or more past feature submissions associated with a threshold semantic similarity to the candidate feature.

Process 600 may include additional implementations, such as any single implementation or any combination of implementations described below and/or in connection with one or more other processes described elsewhere herein.

In some implementations, process 600 includes performing the natural language processing; determining a quantity of occurrences of each semantically distinct word of a description of the candidate feature; converting each semantically distinct word of the description of the candidate feature to a corresponding integer word identifier based on the quantity of occurrences; generating a sparse vector of the corresponding integer word identifiers; and comparing the semantic meaning using the sparse vector. In some implementations, process 600 includes performing a latent semantic indexing procedure on information relating to a description of the candidate feature; performing a dimensionality reduction procedure to reduce a dimensionality of a result of the latent semantic indexing procedure to within a configured dimensionality range; and comparing the semantic meaning using a result of the dimensionality reduction procedure.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, from a device, a feature submission identifying a candidate feature for a software application;
pre-processing, by the device, the feature submission to reformat data associated with the candidate feature to match a data format associated with stored information regarding past feature submissions;
performing, by the device, natural language processing on the data associated with the candidate feature to determine a semantic meaning of the candidate feature;
generating, by the device, an index of past feature submissions,
wherein generating the index comprises:
concatenating descriptions of the past feature submissions to generate a corpus;
splitting the corpus into a set of segments;
generating vector representations of the set of segments;
determining similarities between the vector representations;
generating a similarity matrix based on the similarities;
converting the similarity matrix into a graph; and
wherein the set of segments represent vertices of the graph and the similarities represent edges of the graph;
comparing, by the device and after generating the index, the semantic meaning of the candidate feature with the index to determine whether the candidate feature matches any past feature submission of the past feature submissions; and
providing, by the device, a response indicating whether the candidate feature matches the past feature submissions,
wherein the response comprises an indication that the candidate feature does not match any past feature submission or information identifying one or more past feature submissions associated with a threshold semantic similarity to the candidate feature.

2. The method of claim 1, wherein performing the natural language processing comprises:
determining a quantity of occurrences of each semantically distinct word of a description of the candidate feature;
converting each semantically distinct word of the description of the candidate feature to a corresponding integer word identifier based on the quantity of occurrences;
generating a sparse vector of the corresponding integer word identifiers; and
wherein comparing the semantic meaning comprises:
comparing the semantic meaning using the sparse vector.

3. The method of claim 1, wherein performing the natural language processing comprises:
performing a latent semantic indexing procedure on information relating to a description of the candidate feature;

performing a dimensionality reduction procedure to reduce a dimensionality of a result of the latent semantic indexing procedure to within a configured dimensionality range; and
wherein comparing the semantic meaning comprises:
comparing the semantic meaning using a result of the dimensionality reduction procedure.

4. The method of claim 1, further comprising:
identifying a data feed associated with a particular industry for which the software application pertains;
subscribing to the data feed;
adding a set of features to the past feature submissions from the data feed; and
wherein comparing the semantic meaning comprises:
comparing the semantic meaning after adding the set of features.

5. The method of claim 1, wherein generating the index further comprises:
training a binary machine learning classifier to summarize descriptions of the past feature submissions based on one or more features of the descriptions; and
performing a text summarization procedure to identify a set of key phrases using the binary machine learning classifier.

6. The method of claim 5, wherein the one or more features include at least one of:
a length of a key phrase,
a frequency of a key phrase,
a quantity of recurring words in a key phrase, or
a quantity of characters in a key phrase.

7. The method of claim 1, further comprising:
determining, based on the index, a trending feature topic; and
providing output identifying the trending feature topic.

8. The method of claim 1, wherein receiving the feature submission identifying the candidate feature for the software application comprises:
receiving the feature submission identifying the candidate feature for the software application via a user interface.

9. A device, comprising:
one or more memories; and
one or more processors, communicatively coupled to the one or more memories, configured to:
train a binary machine learning classifier to summarize descriptions of past feature submissions based on one or more characteristics of the descriptions;
perform a text summarization procedure to identify a set of key phrases using the binary machine learning classifier;
receive a feature submission identifying a candidate feature for an application;
pre-processing the feature submission to reformat data associated with the candidate feature to match a data format associated with stored information regarding the past feature submissions;
perform natural language processing on the data associated with the candidate feature to determine a semantic meaning of the candidate feature;
compare the semantic meaning of the candidate feature with an index of past feature submissions and associated with the set of key phrases to determine whether the candidate feature matches any past feature submission of the past feature submissions;
provide a response indicating whether the candidate feature matches the past feature submissions,
wherein the response includes an indication that the candidate feature does not match any past feature submission or information identifying one or more past feature submissions associated with a threshold semantic similarity to the candidate feature;
    store, based on determining that the candidate feature does not match any past feature submissions, the candidate feature in a blockchain hyperledger network;
    receive a sponsorship indication for an entry in the blockchain hyperledger network corresponding to the candidate feature;
    register the candidate feature for development based on receiving the sponsorship indication;
    track development of the candidate feature based on registering the candidate feature for development; and
    allocate, based on an outcome of tracking the development, one or more tokens to a sponsor associated with the sponsorship indication.

10. The device of claim 9, wherein the one or more processors are further to:
    merge, based on determining that the candidate feature matches a past feature submission, the feature submission of the candidate feature with a description of the past feature submission; and
    provide information identifying a merged feature submission based on merging the feature submission with the description of the past feature submission.

11. The device of claim 9, wherein the one or more processors are further configured to:
    determine, based on the index, a trending feature topic; and
    provide output identifying the trending feature topic.

12. The device of claim 9, wherein the sponsorship indication includes a payment of a set of tokens and initiates a contract for the one or more tokens.

13. The device of claim 9, wherein the one or more processors are further configured to:
    determine that a sponsorship threshold is satisfied based on receiving the sponsorship indication; and
    wherein the one or more processors, when registering the candidate feature for development, are configured to:
        register the candidate feature for development based on determining that the sponsorship threshold is satisfied.

14. The device of claim 9, wherein the blockchain hyperledger network is accessible by users associated with a plurality of different roles, and
    wherein the plurality of different roles includes at least one of:
        an innovator role,
        a co-innovator role,
        an implementor role,
        a mentor role, or
        a reviewer role.

15. The device of claim 14, wherein the one or more processors are further configured to:
    determine a role, of the plurality of different roles, for a user; and
    provide access to one or more features of the blockchain hyperledger network based on the role for the user.

16. The device of claim 9, wherein the one or more characteristics include at least one of:
    a length of a key phrase,
    a frequency of a key phrase,
    a quantity of recurring words in a key phrase, or
    a quantity of characters in a key phrase.

17. The device of claim 9, wherein the one or more processors, when receiving the feature submission identifying the candidate feature for the application, are configured to:
    receive the feature submission identifying the candidate feature for the application via the a user interface.

18. A non-transitory computer-readable medium storing instructions, the instructions comprising:
    one or more instructions that, when executed by one or more processors, cause the one or more processors to:
        receive a feature submission identifying a candidate feature for an application;
        perform natural language processing on data associated with the candidate feature to determine a semantic meaning of the candidate feature;
        generate an index of past feature submissions,
            wherein the one or more instructions, that cause the one or more processors to generate the index, cause the one or more processors to:
                concatenate descriptions of the past feature submissions to generate a corpus;
                split the corpus into a set of segments;
                generate vector representations of the set of segments;
                determine similarities between the vector representations;
                generate a similarity matrix based on the similarities; and
                convert the similarity matrix into a graph,
                    wherein the set of segments represent vertices of the graph and the similarities represent edges of the graph;
        compare the semantic meaning of the candidate feature with the index to determine whether the candidate feature matches any past feature submission of the past feature submissions; and
        provide a response indicating whether the candidate feature matches the past feature submissions,
            not match any past feature submission or information identifying one or more past feature submissions associated with a threshold semantic similarity to the candidate feature.

19. The non-transitory computer-readable medium of claim 18, wherein the one or more instructions, that cause the one or more processors to perform the natural language processing, cause the one or more processors to:
    determine a quantity of occurrences of each semantically distinct word of a description of the candidate feature;
    convert each semantically distinct word of the description of the candidate feature to a corresponding integer word identifier based on the quantity of occurrences;
    generate a sparse vector of the corresponding integer word identifiers; and
    wherein the one or more instructions, that cause the one or more processors to compare the semantic meaning, cause the one or more processors to:
        compare the semantic meaning using the sparse vector.

20. The non-transitory computer-readable medium of claim 18, wherein the one or more instructions, that cause the one or more processors to perform the natural language processing, cause the one or more processors to:
    perform a latent semantic indexing procedure on information relating to a description of the candidate feature;

perform a dimensionality reduction procedure to reduce a dimensionality of a result of the latent semantic indexing procedure to within a configured dimensionality range; and wherein the one or more instructions, that cause the one or more processors to compare the semantic meaning, cause the one or more processors to:
  compare the semantic meaning using a result of the dimensionality reduction procedure.

* * * * *